United States Patent
Krieger et al.

(10) Patent No.: US 7,752,902 B2
(45) Date of Patent: Jul. 13, 2010

(54) TORQUE CONVERTER NON-DESTRUCTIVE INSPECTION AND VERIFICATION FOR REMANUFACTURING

(75) Inventors: Jeffrey J. Krieger, Peoria, IL (US); Keith D. Grondines, Charleston, SC (US); Eric J. Hopkins, Summerville, SC (US); Keith B. Kreider, Summerville, SC (US); James R. Corn, Summerville, SC (US)

(73) Assignee: Caterpillar Inc., Peoria, IL (US)

( * ) Notice: Subject to any disclaimer, the term of this patent is extended or adjusted under 35 U.S.C. 154(b) by 506 days.

(21) Appl. No.: 11/754,204

(22) Filed: May 25, 2007

(65) Prior Publication Data

US 2008/0034854 A1 Feb. 14, 2008

Related U.S. Application Data (60) Provisional application No. 60/803,345, filed on May 26, 2006.

(51) Int. Cl.
*G01M 15/00* (2006.01)
(52) U.S. Cl. .................................. 73/115.02; 73/116.04
(58) Field of Classification Search ............. 73/114.77, 73/115.01, 15.02, 115.03, 115.04, 116.04, 73/116.05, 118.01, 118.02
See application file for complete search history.

(56) References Cited

U.S. PATENT DOCUMENTS

| | | | |
|---|---|---|---|
| 4,356,724 A | 11/1982 | Ayoub et al. | |
| 4,593,556 A * | 6/1986 | Wehr | 73/115.02 |
| 4,788,857 A * | 12/1988 | Myers | 73/116.04 |
| 4,951,467 A | 8/1990 | Walsh et al. | |
| 4,974,710 A | 12/1990 | Murasugi | |
| 4,974,715 A | 12/1990 | Koyama | |
| 5,129,259 A * | 7/1992 | View et al. | 73/115.02 |
| 5,384,958 A | 1/1995 | O'Daniel et al. | |
| 5,445,016 A * | 8/1995 | Neigebauer | 73/115.02 |
| 5,693,878 A | 12/1997 | Giles | |
| 5,746,296 A | 5/1998 | Wirtz | |
| 5,810,138 A | 9/1998 | Bertram et al. | |
| 5,835,876 A * | 11/1998 | Hathaway et al. | 701/62 |
| 6,276,056 B1 | 8/2001 | Kolodziej et al. | |
| 6,392,562 B1 | 5/2002 | Boston et al. | |
| 6,651,493 B2 | 11/2003 | Myers et al. | |

(Continued)

OTHER PUBLICATIONS

Anonymous: "TSB 96-26-12: Transaxle-Torque Converter Replacement Guidelines and Torque Converter/Transaxle Cooling System Cleaning Procedures-Service Tip-Transmission-Torque Converter Replacement Guidelines and Torque Converter/Transmission Cooling System Cleaning Procedures-Service Tip," XP002476725, Retrieved from Internet, http://www.ford-trucks.com/tsb/fulltext/show_article.php?tsb=96-26-12, retrieved Apr. 16, 2008.

*Primary Examiner*—Eric S McCall
(74) *Attorney, Agent, or Firm*—Andrew J. Ririe; Janda M. Carter (57) ABSTRACT

A torque converter may be inspected and verified using non-destructive testing methods so that the torque converter may be reused in a remanufacturing operation. The methods will permit a torque converter to be verified without needing to cut open the torque converter's housing to perform a close visual inspection. Rather, the methods make non-destructive inspection and verification possible.

10 Claims, 4 Drawing Sheets

U.S. PATENT DOCUMENTS

7,421,888 B2 * 9/2008 Long et al. ............... 73/114.39
2002/0005074 A1 1/2002 Myers et al.
2007/0266796 A1 * 11/2007 Long et al. ............... 73/862.08

* cited by examiner

TORQUE CONVERTER NON-DESTRUCTIVE INSPECTION AND VERIFICATION FOR REMANUFACTURING

CROSS REFERENCE TO RELATED APPLICATIONS

This application claims the benefits of priority to earlier filed U.S. provisional patent application No. 60/803,345 filed on May 26, 2006.

TECHNICAL FIELD

The field of this invention is non-destructive inspection and verification of powertrain components, and more specifically the non-destructive inspection and verification of torque converters to permit torque converters to be reused in a remanufacturing operation.

BACKGROUND

Remanufacturing is a rapidly growing industry and philosophy. Remanufacturing means removing manufactured products from current use, processing them in a manufacturing environment where they are efficiently and completely repaired and prepared for further life, then returning the remanufactured product to customers for additional service. Customers exchange cores, which are the used products, for a remanufactured replacement product at a dealer or other repair facility. Remanufacturers gather the cores together at a manufacturing facility where the cores are typically disassembled, cleaned, inspected, repaired, reassembled, and then sold back to customers as a remanufactured product. Remanufacturing extends the life of products, which results in cost savings, economy of resources, and environmental benefits. The quality of remanufactured products is typically as good as, and in some cases better than, the original new product.

The automotive industry remanufactures a large variety and volume of products. Transmissions and engines are common examples of products that are remanufactured then sold to customers as rebuilt service parts. In the automotive industry, rebuilt is an adjective commonly used to describe remanufactured products.

When automotive automatic transmissions are returned as cores, the torque converter is typically still installed in the transmission. At the remanufacturing facility, the torque converter will be separated from the transmission, and undergo various steps to prepare it to be reattached to another remanufactured transmission that will eventually be sold to a customer. The steps a torque converter may undergo include inspection to determine which torque converters have components needing repair or replacement, and repair for those which fail the inspection.

A significant proportion of automotive torque converters are constructed with a housing comprising two clam shell-like halves that are welded together along an exterior seam. In order to perform the inspection steps, a current common practice is to first cut the two clam shell-like halves apart along the weld seam. Then the torque converters, whose internal components can now be easily accessed, are inspected and verified. Some portion of the torque converters fail the inspection and require repair of the internal components. But a significant portion passes the inspection and does not require repair. Those that pass the inspection and verification are then rewelded along the original weld seam and are ready for reinstallation into a remanufactured transmission. This cutting and rewelding of those torque converters that will pass the inspection and be reused without any repair steps represents an expense which is desirable to avoid. However, there is currently no method of performing inspection and verification to identify those good torque converters without first cutting open the torque converter's housing.

SUMMARY

A torque converter may be inspected and verified using non-destructive testing methods so that the torque converter may be reused in a remanufacturing operation. The methods will permit a torque converter to be verified without needing to cut open the torque converter's housing to perform a close visual inspection. Rather, the methods make non-destructive inspection and verification possible.

DETAILED DESCRIPTION

Detailed, illustrative examples of methods and hardware for non-destructive torque converter inspection and verification will now be provided. These examples are intended to be illustrative only and to teach the principles of the invention. These examples are not intended to define the limits of protection for the invention. The scope of patent protection is to be defined in the appended claims.

Various possible steps for inspection and verification will be described. All of these steps may be necessary for satisfactorily testing and verifying some torque converters. But torque converters of different models and from different manufacturers have different designs. Different designs mean that the torque converters have different potential failure modes and require different types of inspection and verification to detect the failure modes. So some of these steps may not be appropriate for all torque converters. A person of ordinary skill in this art will be able to select from amongst the disclosed steps those that are appropriate to test and inspect a particular torque converter.

Likewise, a general outline of a sequence of steps may be provided that is appropriate for one type of torque converter. Other types of torque converters may require a different sequence of the steps. Those of ordinary skill in this art, with the assistance of this disclosure, will be able to select the sequence of steps that bests suits testing and verification of a particular torque converter.

The goal of the testing and verification is to separate those torque converters which may require repair or may need to be scrapped, from those that are ready to be reused. Those torque converters which may require repair could be disassembled and appropriate repair procedures and methods followed. Those torque converters which are ready to be reused according to the testing and verification may, nonetheless, have certain minor defects or problems. The object of the testing and verification is not to identify every possible defect with absolute precision. But the disclosed methods should be able to detect defects to a level of certainty and precision that would allow the reused torque converters to perform reliably according to consumer expectations.

The testing and verification is nondestructive in the sense that it does not damage torque converters which do not have defects which require repair, so that after testing those torque converters can be reused. As discussed above, this nondestructive method will be advantageous so that torque converters which are in good condition are not unnecessarily cut open and rewelded shut. The expense saved from avoiding this unnecessary cutting and rewelding of torque converters may be very significant.

Figure 1:
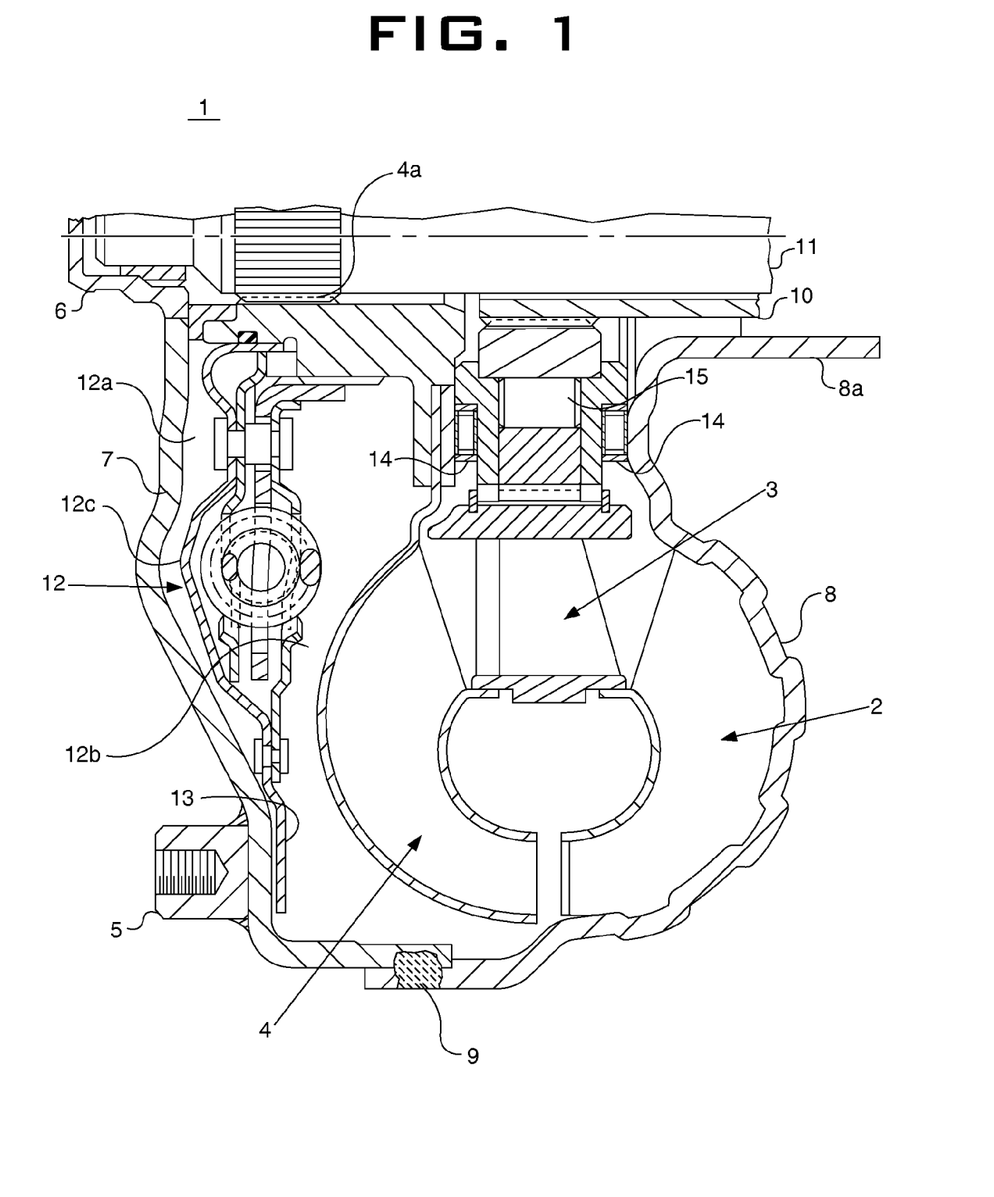
FIG. 1 is a schematic, sectional representation of one typical type of automotive torque converter which could be inspected and verified according to the principles of the invention.

FIG. 1 illustrates one exemplary torque converter which may be tested and verified according to the principles of the invention. The illustrated torque converter is generally standard and well understood in the industry and by those of ordinary skill in this art, so it need not be explained in detail. In FIG. 1, a torque converter 1 includes an impeller assembly 2, a stator assembly 3, and a turbine assembly 4. Lugs 5 connect the torque converter to an engine flywheel. Pilot 6 may fit into the flywheel as well and may help to center the torque converter. Lugs 5 are mounted on converter cover 7. Impeller housing 8 is joined to and rotates with converter cover 7 and lugs 5—they overlap and are joined at a conventional weld seam 9. Thus, when the engine flywheel turns, it drives lugs 5, converter cover 7, and impeller housing 8 at the same rotational speed. Impeller housing 8 in turn rotates the rest of the impeller assembly 2.

In use in a transmission, the impeller assembly 2 pumps transmission fluid and drives the turbine assembly 4 in a well known manner. Stator assembly 3 may be fixed or may rotate relative to a stator shaft 10. Stator assembly 3 serves the purposes of guiding the transmission fluid flow and improving the efficiency of power transfer, as well as multiplying the torque imparted to turbine assembly 4. Stator assembly 3 is splined to hollow stator shaft 10 via an overrunning or one-way clutch 15. One-way clutch 15 is positioned between stator shaft 10 and the stator assembly 3 to permit a portion of the state assembly to rotate under certain operating conditions. The stator shaft 10 could be part of the torque converter or part of the transmission, and is typically fixed against rotation.

Turbine assembly 4 is splined to a turbine shaft 11 which is typically part of the transmission and positioned inside the stator shaft 10. Each of the stator shaft 10 and turbine shaft 11 may also include fluid passageways for bringing transmission fluid into and out of the torque converter 1. Thrust bearings 14 are positioned between the stator assembly 3 and the turbine assembly 4, and between the stator assembly 3 and the impeller assembly 2.

Torque converter 1 also includes a lock-up clutch assembly 12 having a friction disk 13 which contacts the inside of the converter cover 7. When the friction disk 13 contacts the inside of the converter cover 7, it forms a mechanical/frictional link between lugs 5 and the turbine shaft 11 in a known manner. The lock-up clutch assembly can be controlled by the transmission in various ways. In the illustrated torque converter 1, the transmission may send pressurized fluid to one or both of regions 12a or 12b on opposite sides of piston 12c which acts to move friction material against or away from the converter cover 7.

Figure 2:
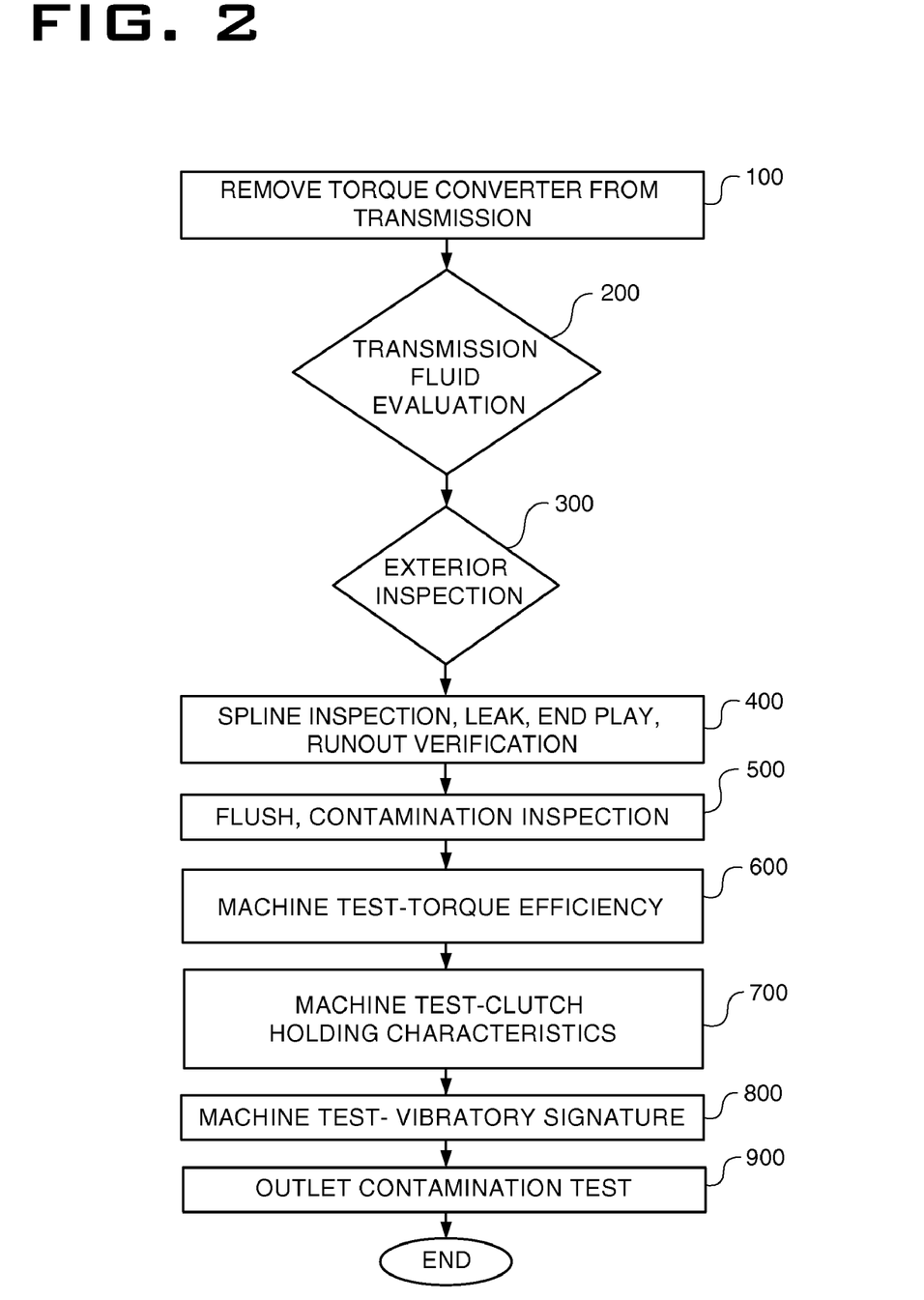
FIG. 2 is an exemplary flow chart to illustrate the inspection and verification steps of the invention.

FIG. 2 illustrates generally a sequence of steps in the testing and verification procedure. At any step, the results may indicate failure of the inspection and verification, meaning the torque converter will not be identified as defect-free and ready for reuse. Torque converters which have failed the inspection and verification may be further processed, such as by cutting open the housing to gain access to the internal components, in order to further determine if they can be reused or repaired. At step 100, the torque converter is removed from the used transmission and received for processing. At this time, the turbine shaft 11 and stator shaft 10 may be disassociated from the torque converter 1.

During step 200, a technician may perform a visual or other type of inspection of the transmission fluid. In automotive transmissions, the transmission and torque converter share the same fluid. If the transmission fluid, or the transmission fluid pan, are observed to contain metal or other foreign particles, then the torque converter may fail the inspection. This inspection failure is due in part to the potentially high degree of susceptibility to damage that the torque converter exhibits when metal or other hard foreign particles are in the transmission fluid. This inspection failure is also due to the difficulty of ensuring that all the foreign particles would be flushed out of the torque converter during cleaning. Ensuring that no foreign particles are in the torque converter 1 after it is reinstalled on a remanufactured transmission helps ensure reliability by guarding against a number of potential failure modes.

Also during step 200, the transmission fluid color may be visually or otherwise inspected. Discolored transmission fluid may indicate that the fluid temperature was raised to a dangerously high level during a period when excess heat was created in the torque converter. Such a high temperature level could have damaged the torque converter, or may indicate an excessive load placed on the torque converter that could have caused damage, so discoloration of the transmission fluid may result in an inspection failure.

During step 300, several exterior features may be inspected. For example, the lugs 5 and the pilot 6 may be visually inspected for damage and wear. Besides a visual inspection, this might also include inspection using a threaded probe to ensure the threads in lugs 5 are to specification. The pilot 6 may also be further inspected by measuring its diameter with a measuring instrument such as an air gage or a micrometer. The torque converter exterior may also be inspected for holes, dents, or other damage. A technician may also visually inspect the weld seam 9 for uniformity, and check for the presence, absence, or looseness of any balancing weights attached to the converter exterior that could negatively affect dynamic balance. An impeller hub 8a which is part of the impeller housing 8 and extends towards the transmission may also be visually inspected for wear or other damage. If any of these features are worn, damaged, missing, etc., then the torque converter may fail the inspection.

During step 400, splines or other connecting features may be inspected for damage and wear. For example, the splines 4a on the turbine assembly which mate with corresponding splines on the turbine shaft 11 may be inspected. Likewise, splines 3a on the stator assembly which mate with corresponding splines on the stator shaft 10 may be inspected. This inspection may be visual, or may utilize a gage block or other internal spline inspection or measurement means to confirm that the splines are within specifications.

Step 400 may also include verification of endplay of the torque converter's internal components, and verification of the runout of the impeller hub 8a. To measure the endplay, a tool is inserted into the torque converter which grasps the internal splines 4a of the turbine assembly 4. The endplay is measured as the total axial distance that the splines 4a can be moved from the extent of its movement in one direction to the extent of its movement in the other. Excessive endplay will indicate that the thrust bearings 14 in the torque converter may be damaged, and other possible failure modes. Runout of the impeller hub 8*a* is measured in a conventional manner using a dial indicator or other tool. The torque converter is placed on a turntable which attaches to the torque converter 1 at each of the lugs 5. The torque converter 1 is turned on the turntable, and the runout at the impeller hub 8*a* is measured. If the splines of the torque converter stator shaft or turbine shaft are excessively worn or damaged, or if the endplay or runout is excessive, then the converter may fail the inspection.

Step 400 may also include verification of any fluid leaks in the torque converter. To verify against fluid leaks, a plug may be inserted into the lug 8*a* to completely seal the internal part of the torque converter 1 from the outside. Compressed air may then be pumped through the plug into the torque converter. Leaks will be indicated if the pressure in the torque converter decays. Or, the torque converter may be immersed in water and a visual inspection of bubbles may be performed. If the torque converter leaks, then the converter may fail the inspection.

Step 500 may include the flushing and draining of the torque converter. This may be accomplished in a standard procedure using standard equipment. The procedure typically involves pumping a cleaning fluid into the torque converter's circuit for receiving fluid from the transmission, while turning the turbine assembly 4 and holding against rotation the impeller assembly 2 and the stator assembly 3. A shaft may be inserted into the torque converter 1 in the place of turbine shaft 11 to turn the turbine assembly 4. And a shaft may also be inserted into the torque converter 1 in the place of stator shaft 10 to hold the stator assembly 3, although in many cases it will not be necessary. The impeller assembly 2 will be held against rotation by external fixturing. After flushing, the torque converter may be drained in a standard procedure.

Unlike the standard procedure, while the fluid is being flushed from the torque converter, part of the fluid stream may pass through a particle counter to measure the cleanliness of the fluid. The particle counter may be of the type which has a light source and a detector, where the light passes from the source through the fluid if the fluid is clear with no debris, and the light is detected at the detector. The momentary absence of detected light at the detector indicates a passing debris particle in the fluid stream. Or the particle counter may be another type of instrument to measure the cleanliness of the fluid. It is expected that the fluid leaving the converter will have some level of particle contamination. However, if the level of contamination is too high, then it may be likely that the converter has been damaged by the particles, or that the converter itself is producing the particles due to a damaged bearing or other damaged wear surface. The level of contamination may be indicated by an average or mean particle count reading taken near the beginning of the flush process. Even if the particle count decays over time as contaminants are flushed from the converter, if the original particle count was too high, this could indicate a current or future failure of bearings, wear surfaces, friction material, etc. If the level of contamination is too high, the converter may fail the inspection.

Figure 3:
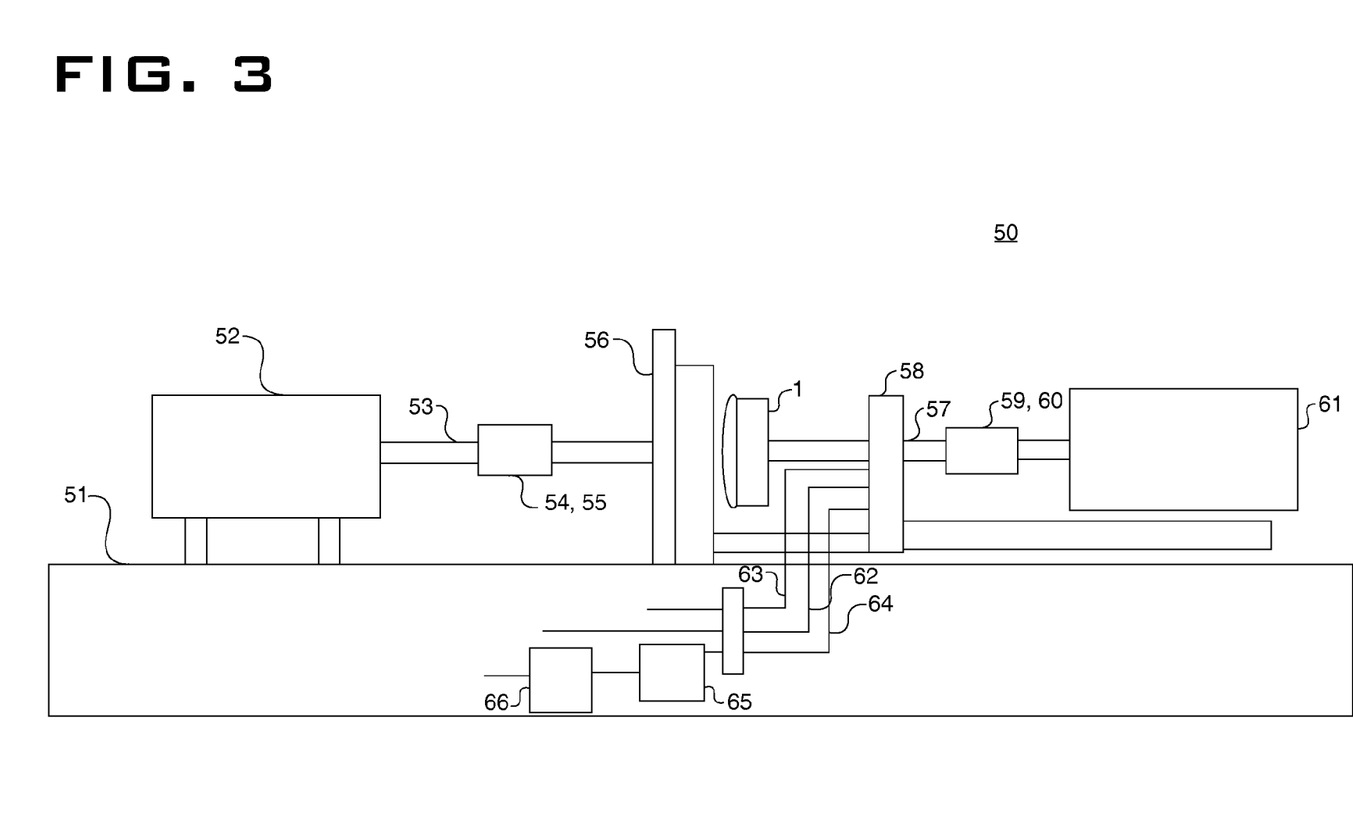
FIG. 3 is a schematic illustration of a torque converter dynamometer setup to perform the dynamometer testing and verification steps.

Steps 600, 700, and 800 will be conducted while the torque converter is attached to a dynamometer. FIG. 3 schematically illustrates an exemplary dynamometer setup. Dynamometer 50 includes a base or bed 51. A drive motor 52 may be mounted to the base 51 and drive an input shaft 53. Associated with input shaft 53 are an input torque transducer 54 and input speed transducer 55. The input shaft 53 drives the torque converter 1 through connections to the lugs 5 and possibly the pilot 6 (see FIG. 1). A load pallet may be optionally used to efficiently bring the torque converter 1 to the dynamometer 50 and load it into the proper position and orientation. On the other side of torque converter 1, shaft 57 connects to the turbine assembly 4 in the place of turbine shaft 11 (see FIG. 1). Adapter 58 extends into the torque converter 1 and engages the stator assembly 3 in place of the stator shaft 10. Shaft 57 and adapter 58 may include fluid passageways for bringing fluid to and from the torque converter in the same fashion as corresponding fluid passageways would in a transmission. Shaft 57 and adapter 58 may include any appropriate connecting or mating structure so that torque converter 1 may function normally as it would in a transmission while being tested in dynamometer 50. Output torque transducer 59 and output speed sensor 60 may be associated with shaft 57. Shaft 57 may be operatively connected to load motor 61. Preferably, drive motor 52 and load motor 61 may operate as either motors or generators to produce power or absorb power. Load motor 61, shaft 57, and adapter 58 may be slidably mounted on base 51, so that they can be slid away to remove and insert a torque converter into the dynamometer. Alternatively, of course, drive motor 52 may be slidably mounted to the base 51 for the same purpose.

Three hydraulic circuits are arranged to bring fluid to or from the torque converter 1 during testing. Hydraulic circuit 62 brings hydraulic fluid into the torque converter 1 in a standard fashion, similar to how transmission fluid would pass from the transmission into the torque converter during use. Hydraulic circuit 63 brings hydraulic fluid into the torque converter for control or actuation of the lock-up clutch 12, again, in a manner similar to a transmission. And, hydraulic circuit 64 brings fluid out of the converter. Hydraulic circuit 64 is associated with a particle counter 65 and a filter 66. The hydraulic fluid may be in an open circuit, with fluid from hydraulic circuit 64 being dumped into a sump. Before reaching the sump, the fluid is cleaned of any contaminating particles by the filter 66. Alternatively, a second filter could be arranged on the hydraulic circuits 62 and 63 instead of or in addition to the filter 66. The sump may include heating and/or cooling means for maintaining the temperature of the fluid at a constant level. A pressure compensated pump may be provided to provide a constant pressure source of fluid to the converter through the hydraulic circuit 62, in a fashion similar to the way a transmission would supply fluid to the torque converter. Pressure transducers or flow transducers may optionally be arranged on any or all of the hydraulic circuits for various measurements.

Figure 4:
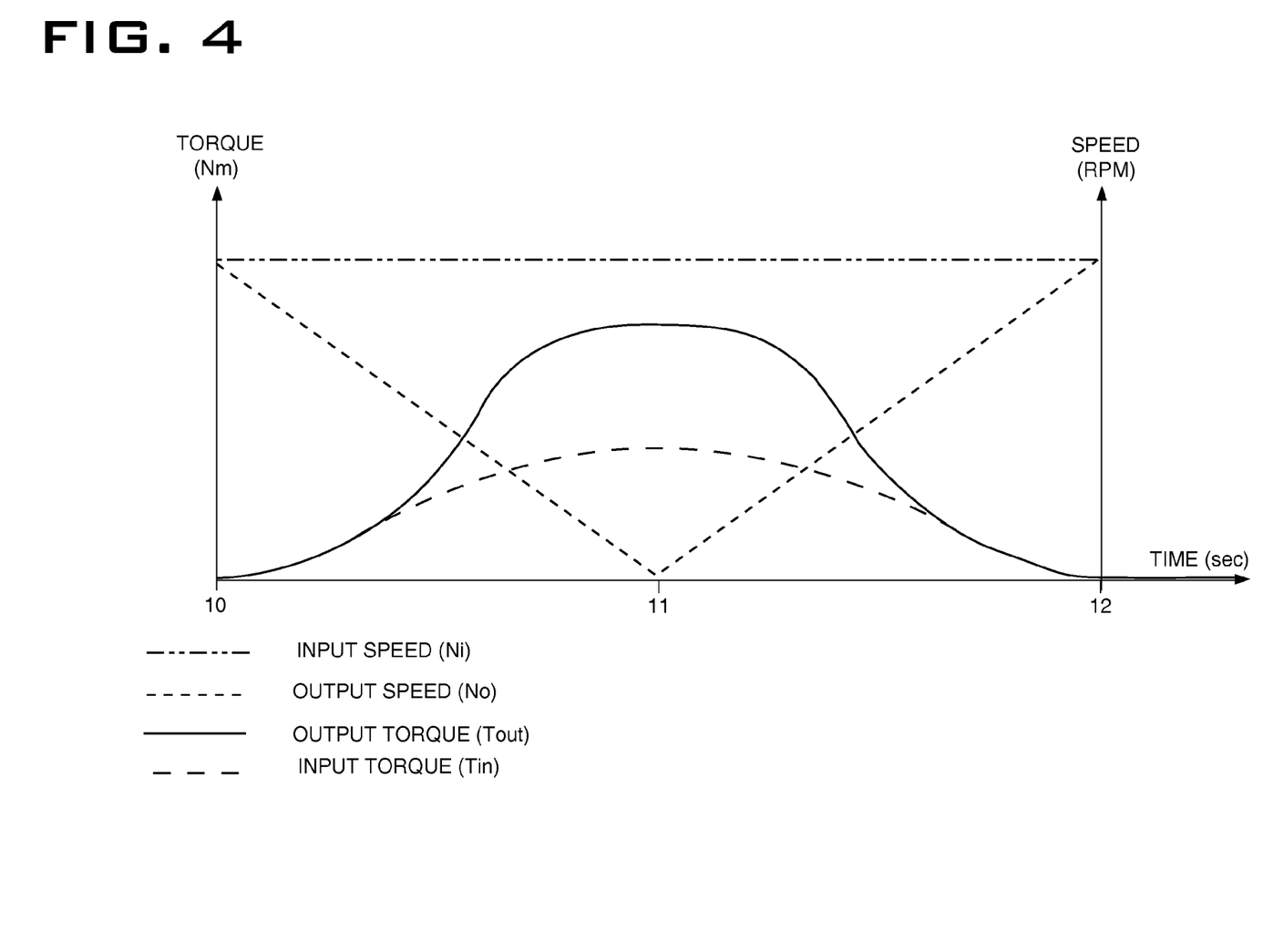
FIG. 4 is a schematic chart illustrating one test for dynamically testing the operation of a torque converter.

Step 600 includes testing the dynamic operation of the torque converter. Several tests may be performed in step 600 to verify the proper functioning of the torque converter. An example of one type of test is illustrated by the chart in FIG. 4. At the beginning of the test, the impeller assembly 2 and the turbine assembly 4 are brought to approximately the same rotational speed, such as 2,000 r.p.m. A portion of the stator assembly 3 is held against rotation by the adapter 58, but the remainder of the stator assembly may rotate as it would in normal operation. Then torque is applied to the turbine shaft 11 by load motor 61 to reduce its speed, the output speed, while the speed of the impeller assembly, the input speed, is held constant by drive motor 52. The output speed is forced to follow a preset curve or line until the output speed reaches zero and the torque converter is fully stalled. The torque required to be applied to the turbine shaft 11 during the entire test is measured by output torque transducer 59 and recorded. The output torque should fall within a narrow band that may be predetermined for each type and model of torque converter. If the output torque falls outside of the band during the test, then the torque converter may fail the inspection. The same process may be repeated by gradually decreasing the output torque applied to the turbine shaft 11 until the speed of the turbine assembly 4 once again approaches the speed of the impeller assembly 2. If the output torque is not within the predetermined band for the torque converter, this may indicate a broken or worn blade in any of the impeller assembly 2, stator assembly 3, or turbine assembly 4, as well as other possible failure modes.

During this dynamic load testing, or another type of dynamic load testing, the temperature, pressure, and flow rate of fluid entering and leaving the torque converter over any of the three hydraulic lines 62, 63, and/or 64 may be measured. The fluctuations of these measurements should also fall within certain narrow bands during the dynamic load testing. The bands may be pre-established for each type and model of torque converter. If any of these measurements fall outside of their band, then the torque converter may fail the inspection.

Step 700 includes tests that check the performance of the lock-up clutch 12. This test could also be performed on the dynamometer 50 illustrated in FIG. 3. One example of this test involves turning the impeller assembly 2 at a speed somewhat faster than the turbine assembly 4. Then the lock-up clutch is engaged by either removing or adding fluid pressure to the hydraulic circuit 63, according to the type of torque converter. By watching the speed of the turbine assembly 4 and identifying a step change, the moment at which the lock-up clutch contacts the converter cover 7 can be determined. The time required for the lock-up clutch 12 to engage the converter cover 7 after fluid actuation should fall within a certain limit. If the actuation time falls outside of that limit, this may indicate a damaged or broken piston, a missing or broken internal seal in the torque converter, or other possible failure modes. The same test may be performed while disengaging the lock-up clutch 12 by measuring the time until disengagement and comparing that to a limit. If the engagement and disengagement times do not fall within respective limits, then the torque converter may fail the inspection.

In addition, during step 700 while the lock-up clutch 12 is engaged, torque may be added to turbine assembly 4 while the impeller assembly 2 is held against rotation to measure how well the lock-up clutch 12 holds. The lock-up clutch 12 should hold the turbine assembly against rotation up to a certain torque limit. If the lock-up clutch is not able to hold the turbine assembly up to the torque limit, the torque converter may fail the inspection. This portion of the test will detect worn, damaged, or missing friction material, holes in or other damage to the piston 12c, and other possible failure modes.

Again, during this lock-up clutch operational testing in step 700, the temperature, pressure, and flow rate of fluid entering and leaving the torque converter over any of the three hydraulic circuits 62, 63, and/or 64 may be measured. The fluctuations of these measurements should also fall within certain narrow bands during the dynamic load testing. The bands may be pre-established for each type and model of torque converter. If any of these measurements fall outside the band, then the torque converter may fail the inspection.

Step 800 includes tests that measure vibrations of the torque converter during dynamic loading. One such test will be described below, although other tests are possible. These vibration tests may be conducted on a dynamometer such as the dynamometer 50 in FIG. 3 that may also be used for the dynamic loading test and lock-up clutch function testing, or on a different dynamometer especially adapted for this purpose.

One vibration test may be designed to test the operation of thrust bearings 14 which are located between the stator assembly 3 and the impeller assembly 2, and between the stator assembly 3 and the turbine assembly 4. In order to test the thrust bearings 14, the turbine assembly 4 may be rotated at a predetermined speed by the shaft 57, while the input shaft 53 holds the impeller housing 8 and the impeller assembly 2 against rotation. The vibration of the torque converter may be measured by one or more accelerometers arranged on the impeller housing 8. The accelerometers in this position may mostly measure axial acceleration, which will be the most indicative of the operation of the thrust bearings 14. The vibrations may be measured at several speeds, if necessary, to gain an accurate picture of the operation of thrust bearings 12. The vibrational signature, for example a frequency and magnitude domain chart of the detected accelerations, for each test may be compared against a norm. If the signature falls outside the norm, the torque converter may fail the test.

Another desirable vibration test would be to test the dynamic vibration of the impeller assembly 2, impeller housing 8, and converter cover 7. This type of vibrational test may be similar to tests performed on new torque converters in order to balance them with added weights. The impeller assembly 2, impeller housing 8, and converter cover 7 are rotated at a high speed, while the remainder of the torque converter 1 components are held in place or allowed to float. The vibrations would be measured as accelerations in all directions. This test would indicate an out of balance torque converter.

Finally, step 900 involves verifying the particle count of the fluid leaving the torque converter while it is tested on dynamometer 50. The particle count is taken by particle counter 65. The particle count may be measured during one, several, or all of the tests done with the torque converter on dynamometer 50. During the testing regime, the particle count, after being normalized by the varying fluid flow rates, should remain relatively constant. If the particle count transiently increases during any portion of the testing, such as during high loading of some component in the converter, this may indicate a failing component. Or if the particle count gradually increases over the time of the test, this may indicate a failing component. Either one or both of these standards, or any other standard of comparing to an acceptable particle count, may be used to verify the operation of the converter. If the particle count falls outside of pre-established bounds, then the converter may fail.

INDUSTRIAL APPLICABILITY

The testing methods disclosed herein may be used in industry to verify that a torque converter is acceptable for reuse in a remanufacturing operation. The methods will permit a torque converter to be verified without needing to cut open the torque converter's housing to perform a close visual inspection. Rather, the methods make non-destructive inspection and verification possible.

We claim:

1. A method of inspecting a torque converter comprising:
    conducting a dynamometer test to verify the rate of engagement of a lock-up clutch in the torque converter; and
    conducting a fluid contamination test to determine the number of particles in fluid that is leaving the torque converter during the dynamometer test.
2. A method according to claim 1 further comprising:
    using results of the dynamometer test and results of the fluid contamination test to help determine whether the torque converter can be reused without performing any destructive repair steps.

3. A method according to claim 1 wherein the dynamometer test also verifies the dynamic efficiency of the torque converter in converting input rotation energy into output rotational energy across a range of input versus output speeds.

4. A method according to claim 3 further comprising performing an inspection of fluid that is present in the torque converter when the torque converter is removed from a transmission, and using results of this inspection of fluid to help determine whether the torque converter can be reused without performing any destructive repair steps.

5. A method according to claim 3 further comprising:
conducting a vibratory signature test of the torque converter while components of the torque converter are rotating and using the results of the vibratory signature test to help determine whether thrust bearings in the torque converter are operating within acceptable limits.

6. A method according to claim 5 wherein the vibratory signature test also verifies whether components in the torque converter are rotationally balanced.

7. A method according to claim 3 further comprising:
measuring characteristics of fluid entering or leaving the torque converter during the dynamometer test.

8. A method according to claim 7 further comprising:
conducting a vibratory signature test of the torque converter while components of the torque converter are rotating and using the results of the vibratory signature test to help determine whether thrust bearings in the torque converter are operating within acceptable limits.

9. A method according to claim 8 wherein conducting the vibratory signature test comprises placing accelerometers on the torque converter's exterior housing, rotating a portion of the torque converter's stator assembly while holding the torque converter's exterior housing against rotation.

10. A method according to claim 9 wherein conducting the vibratory signature test further comprises using the accelerometers to measure vibrational movements of the torque converter's exterior housing primarily in a direction parallel to the axis of rotation of the stator assembly.

* * * * *